Figure 1:
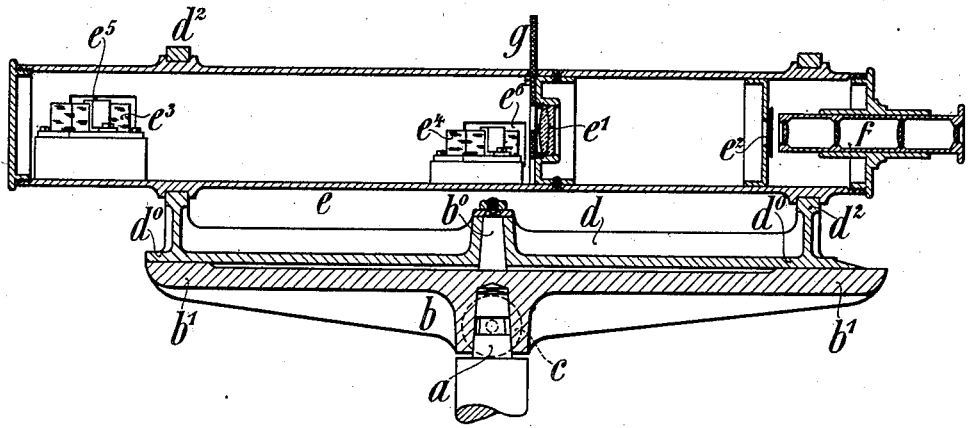

C. PULFRICH.
TELEMETER FOR TWO SUCCESSIVE OBSERVATIONS.
APPLICATION FILED OCT. 13, 1908.

941,812.

Patented Nov. 30, 1909.

Witnesses:
Paul Krüger
Fritz Sander

Inventor:
Carl Pulfrich

UNITED STATES PATENT OFFICE.

CARL PULFRICH, OF JENA, GERMANY, ASSIGNOR TO THE FIRM OF CARL ZEISS, OF JENA, GERMANY.

TELEMETER FOR TWO SUCCESSIVE OBSERVATIONS.

941,812.     Specification of Letters Patent.     Patented Nov. 30, 1909.

Application filed October 13, 1908. Serial No. 457,488.

*To all whom it may concern:*

Be it known that I, CARL PULFRICH, a citizen of the German Empire, and residing at Carl-Zeiss strasse, Jena, in the Grand Duchy of Saxe-Weimar, Germany, have invented a new and useful Telemeter for Two Successive Observations, of which the following is a specification.

The invention consists in an improvement on the telemeter described and represented in the American specification 519,319, Figures 8 to 10. In that telemeter the carrier of the instrument proper is mounted to be rotatable in the horizontal plane on and relatively to a likewise horizontally rotatable base plate a micrometrical device being provided for measuring the first mentioned rotation. Two sighting telescopes are mounted on the carrier, the sighting lines of which are located parallel and in the same direction, but do not lie in the same vertical plane. After two sighting observations, the instrument furnishes the horizontal distance from the vertical axis of the micrometric rotation to the object point, if the following procedure be taken. After having adjusted the instrument horizontally so that the axes of the horizontal rotations stand vertical, one telescope is used for sighting upon the object point by giving the base plate of the telemeter the requisite horizontal rotation and if necessary also rotating both telescopes parallel to the vertical sighting planes. If, in this first telescope, the image of the object point be brought to coincide with the sighting mark, the telescope carrier is rotated micrometrically in the horizontal plane until the second telescope shows the image of the object point covered by the sighting mark. The angle, about which the pair of telescopes were micrometrically rotated between the first and second observations, is the horizontal projection of the angle between the directions given to the sighting lines in the two observations. For computing the horizontal distance between the vertical axis of the micrometrical rotation and the object point only the horizontal base line is still required, which, passing through this axis, completes the horizontal projections of the directions of sight into a triangle. Its length is equal to the distance between the vertical planes of the two sighting lines. The micrometrical division can directly indicate the distances.

The object of the present improvement consists principally in reducing the time required for each single measurement. For this purpose the two sighting telescopes are combined in such a manner that they at least have the ocular in common. The observer then no longer is compelled to change over to another ocular before making the second sighting observation, for which purpose he must take another standing-place and adapt the position of his head to the new ocular field.

The employment of a common ocular is well-known for such telemeters in which both telescope images have to be viewed simultaneously, in order to compare their relative positions. It is therefore obvious that the same devices, by means of which the two image fields can be arranged separately in the ocular field of the said monocular telemeters for simultaneous observations, can be adopted in the present instrument. In this case each image field retains a separate sighting mark, but of course a single vertical thread, for instance, may represent both marks, when the image fields are located one above the other. Another arrangement of the telemeter, in which the two images are produced successively in a common image field filling the entire ocular field, seems to be still more advantageous. This requirement can be fulfilled, for instance, by employing, in addition to the single ocular, only one sighting mark and one objective in common for both telescopes, the simultaneous production of two images being obviated by a reversible shutter or a reversible or removable objective prism.

Figure 2:
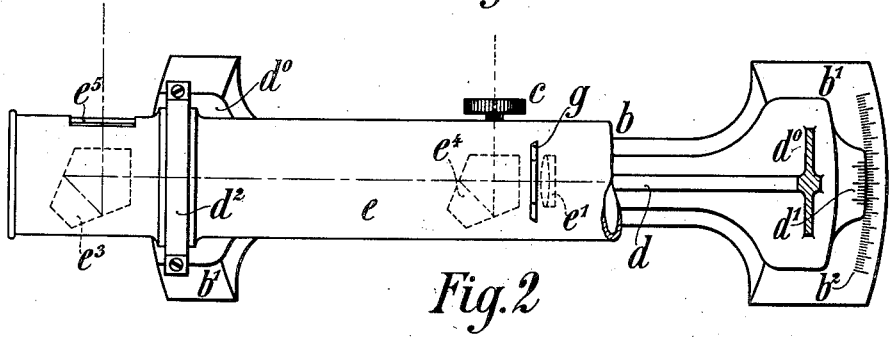
Figure 3:
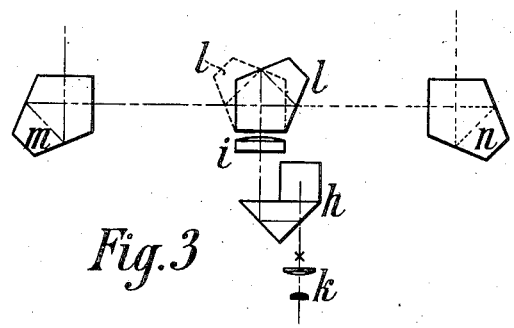
Figure 4:
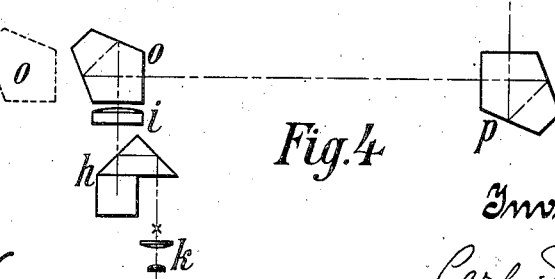

In the annexed drawing: Fig. 1 is a longitudinal vertical section of a telemeter constructed according to the invention. Fig. 2 is the plan view of the same telemeter, the hinder part of the telescope being broken off. Fig. 3 is the plan view of the optical parts of another telemeter. Fig. 4 is the plan view of the optical parts of a third telemeter.

Referring to Figs. 1 and 2, on the pivot $a$ of the stand the base plate $b$ of the instrument is rotatably mounted and can be clamped by a screw $c$. The base plate $b$ has coaxially to its own axis of rotation a pivot $b^0$ for the carrier $d$ of the telescope, which also rests by means of its wings $d^0$ on the extensions $b^1$ of the base plate. The scale $b^2$ and the vernier $d^1$ serve for micrometrically indicating the rotation. The standards $d^2$ carried by the wings $d^0$ support the cylindrical telescope casing $e$, so that it can be rotated about its geometrical axis. This axis is at the same time that of the optical parts common to both telescopes, viz., of the objective $e^1$, the thread sighting mark $e^2$ and the image erecting ocular $f$. A slotted slide $g$ arranged immediately before the objective $e^1$ serves as the reversible shutter, obstructing in one end position the upper and in the other the lower half of the objective. The rays from the receiving prism $e^3$ enter the upper, and those from the receiving prism $e^4$ the lower half of the objective. The apertures $e^5$ and $e^6$ provided in the casing $e$ allow the light which proceeds from the objective to enter the prisms $e^3$ and $e^4$. Prism $e^4$ lies in the axis of the micrometrical rotation, so that the triangle on which the measurement of the distance is based is right-angled, the base line standing perpendicular to that position of the vertical sighting plane which is obtained by sighting with the prism $e^3$. If the object point be considerably above or below the horizon, the casing $e$ is correspondingly rotated about its axis. It is evident that the parts $e^1$, $e^2$ and $f$ could also be fixed on $d$, so that the shutter $g$ and the prisms $e^3$ and $e^4$ only need remain in the rotatable casing $e$.

In the examples shown in Figs. 3 and 4 the receiving prisms are assumed as having full height to utilize the entire objective. The erection of the image is effected by means of a Porro prism system $h$ arranged between the objective $i$ and the Ramsden ocular $k$. In the example Fig. 3, the receiving prisms $m$ and $n$ are successively connected with the objective $i$ by reversing the objective prism $l$ as indicated by the second, dotted position of the same. In the example Fig. 4, by moving the objective prism $o$ into the dotted position the receiving prism $p$ is put out of action and the sighting line coinciding with the objective axis made available.

I claim:
1. A telemeter for two successive observations, consisting of a horizontally rotatable base, a carrier pivotally mounted on the base so as to be horizontally rotatable relatively to it, a micrometrical device for measuring the latter rotation and a telescopic system in which two telescopes are combined so that at least the ocular is common to both, this system being mounted with the two sighting lines parallel to each other in different vertical planes and together rotatable in their vertical planes.

2. A telemeter for two successive observations, consisting of a horizontally rotatable base, a carrier pivotally mounted on the base so as to be horizontally rotatable relatively to it, a micrometrical device for measuring the latter rotation and a telescopic system in which two telescopes are combined, this system being mounted with the two sighting lines parallel to each other in different vertical planes and together rotatable in their vertical planes and comprising one ocular, one sighting mark, one objective, a prism system mounted in front of the objective and adapted to utilize the objective for both sighting lines and means for successively making the two telescopes operative.

3. A telemeter for two successive observations, consisting of a horizontally rotatable base, a carrier pivotally mounted on the base so as to be horizontally rotatable relatively to it, a micrometrical device for measuring the latter rotation and a telescopic system in which two telescopes are combined, this system being mounted with the two sighting lines parallel to each other in different vertical planes and together rotatable in their vertical planes and comprising one ocular, one sighting mark, one objective, a prism system mounted in front of the objective and adapted to utilize the objective for both sighting lines, of the prisms of which system that immediately before the objective is movable.

CARL PULFRICH.

Witnesses:
PAUL KRÜGER,
FRITZ SANDER.